US012485425B2

(12) United States Patent
Giacomel et al.

(10) Patent No.: US 12,485,425 B2
(45) Date of Patent: Dec. 2, 2025

(54) SYSTEM FOR CHANGING THE HAMMERS OF A SHREDDER AND RELATIVE METHOD

(71) Applicant: DANIELI & C. OFFICINE MECCANICHE S.P.A., Buttrio (IT)

(72) Inventors: Alessio Giacomel, Fiume Veneto (IT); Davide Braga, San Giovanni al Natisone (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 268 days.

(21) Appl. No.: 18/032,995

(22) PCT Filed: Oct. 21, 2021

(86) PCT No.: PCT/IB2021/059712
§ 371 (c)(1),
(2) Date: Apr. 20, 2023

(87) PCT Pub. No.: WO2022/084906
PCT Pub. Date: Apr. 28, 2022

(65) Prior Publication Data

US 2023/0398549 A1 Dec. 14, 2023

(30) Foreign Application Priority Data

Oct. 21, 2020 (IT) ........................ 102020000024889

(51) Int. Cl.
*B02C 13/26* (2006.01)
*B02C 19/00* (2006.01)
*B02C 25/00* (2006.01)

(52) U.S. Cl.
CPC .............. *B02C 13/26* (2013.01); *B02C 25/00* (2013.01); *B02C 2013/29* (2013.01); *B02C 19/0062* (2013.01)

(58) Field of Classification Search
CPC ..... B02C 2013/29; B02C 13/26; B02C 25/00; B02C 19/0062
See application file for complete search history.

(56) References Cited

U.S. PATENT DOCUMENTS 3,979,078 A * 9/1976 Boddeker ............. B02C 13/282
241/285.3
4,575,014 A 3/1986 Szalanski et al.
(Continued)

FOREIGN PATENT DOCUMENTS

CN 2577954 Y 10/2003
CN 104525313 A * 4/2015
(Continued)

OTHER PUBLICATIONS

Translation of CN-111250221.*
(Continued)

*Primary Examiner* — Bobby Yeonjin Kim
(74) *Attorney, Agent, or Firm* — Tutunjian & Bitetto, P.C.

(57) ABSTRACT

The invention relates to a system for changing the hammers of a shredder including a shredder with one or more covers and a rotating drum equipped with a plurality of hammers; a lifting system suitable to move said hammers and a control unit which controls both the opening of the shredder and the movements of the lifting system and preferably also the unlocking/locking of the hammers from/on the drum to allow their replacement. The system can be managed hydraulically with a single hydraulic supply. It is included to be able to control the system remotely or to include its automation according to a maintenance plan. A relative method for changing the hammers of a shredder is also disclosed.

14 Claims, 1 Drawing Sheet

(56) References Cited

U.S. PATENT DOCUMENTS

| | | | | |
|---|---|---|---|---|
| 2012/0102703 | A1* | 5/2012 | Salamanca | B25J 11/00 901/31 |
| 2016/0114331 | A1* | 4/2016 | Young | B02C 13/09 241/189.1 |

FOREIGN PATENT DOCUMENTS

| | | | |
|---|---|---|---|
| CN | 111250221 | A * | 6/2020 |
| DE | 2437793 | A1 | 2/1976 |
| JP | 1986-015745 | A | 1/1986 |
| JP | 2015-075357 | A | 4/2015 |
| JP | 2019-072705 | A | 5/2019 |
| JP | 2019-089140 | A | 6/2019 |
| KR | 10-2011-0069764 | A | 6/2011 |
| WO | 2009/156420 | A1 | 12/2009 |

OTHER PUBLICATIONS

Translation of CN-104525313.*

International Search Report for PCT/IB2021/059712 dated Mar. 9, 2022 (4 pages).

Korea Office Action issued in corresponding KR Patent Application No. 10-2023-7013133, pp. 1-11 (English Translation Attached).

* cited by examiner

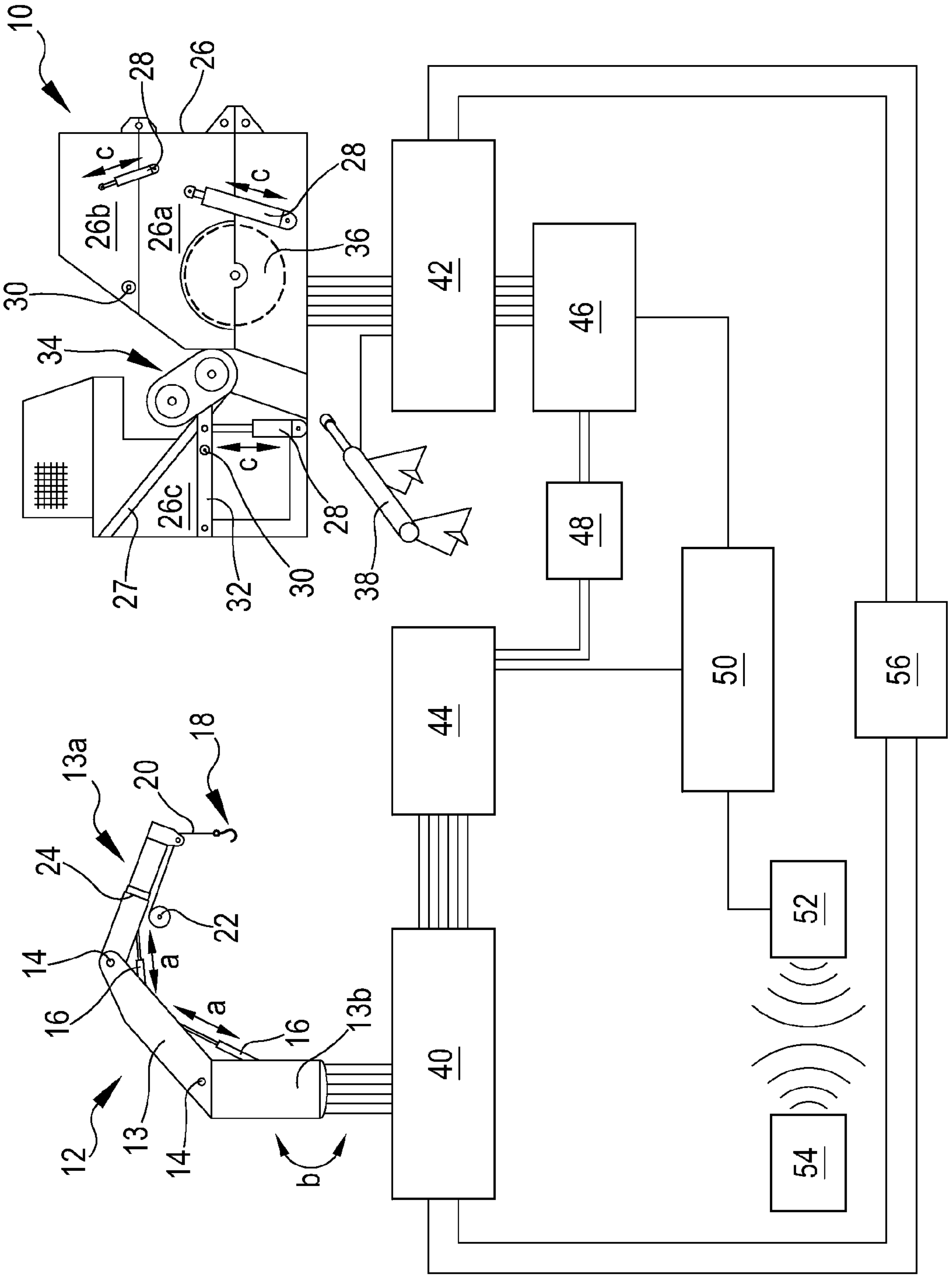
10
26
28
c
26b
26a
36
30
34
26c
27
32
38
42
46
48
50
44
56
40
52
54
13a
20
18
24
22
14
16
a
13b
13
12
b

SYSTEM FOR CHANGING THE HAMMERS OF A SHREDDER AND RELATIVE METHOD

TECHNICAL FIELD

The invention belongs to the field of shredding various materials, in particular scrap, and relates in particular to a system for changing the hammers of shredders or crushers, which comprises:

(a) a shredder in turn comprising
  (a1) a housing defining a shredding chamber and which is equipped with one or more covers which can be lifted and lowered by means of relative lifting devices, in particular hydraulic lifting devices;
  (a2) inside said housing a rotating drum equipped with a plurality of hammers;
  (a3) a first control system to control said first lifting devices;
(b) a lifting system, preferably hydraulically operated, suitable to move said hammers by means of a second control system in order to control the movements of said lifting system.

BACKGROUND ART

Shredders can be used for shredding very bulky and heavy objects, such as skeletons of vehicles, possibly already compacted, motors, mechanical parts, household appliances, or other, and which therefore require a very high crushing force, to obtain scrap, for example ferrous and non-ferrous metal, suitable to then be recycled, or recovered, to be used for example for feeding melting furnaces.

The material to be treated usually first undergoes a volumetric reduction and then directly enters the shredding or crushing chamber of the shredding device through a special conveyor belt. The fragmentation chamber is characterized by being internally reinforced by metal plates and serves to contain a rotating member, called a mill, consisting essentially of a rotating drum to which a plurality of crushing members is associated, called hammers, which are configured to be dragged and violently impact against the objects to be crushed introduced into the crushing chamber.

Optionally, the housing is also equipped with drive rotors to drive the material to be shredded and/or a chute or conveyor belt to bring the material to be shredded closer to the rotating drum.

In order to carry out the maintenance of the mill and the hammers, it is included that the shredding chamber can be opened by means of a liftable shell or cover of which it is composed. Typically, a hydraulic cylinder system is responsible for this opening/closing. The hydraulic controls of the shredder are arranged in a dedicated control unit thereof.

During the shredder maintenance phase, the shredding chamber must be open. Usually a large pin (or a set of several pins) is inserted transversally in the drum, suitable for the constraint of the hammers.

For the maintenance operations, but above all for the change of hammers (weighing about 90 kg each, but depending on the size of the machine they can reach up to 150 kg and above), currently, a fixed service crane is included, derived from a model usually installed on road vehicles which is used for handling tools and spare parts.

The operator controls the movements of the crane hook, places it above the hammer to be replaced and extracts and moves it towards the unloading area thereof. The controls are manual: a hydraulic distributor with manual levers is placed on a metal support structure near the base of the crane. The crane is also equipped with a local hydraulic power unit thereof. Both of these fixed positions require the operator to be present on site, limiting the vision thereof with respect to the actions which he is making the machines perform.

A valve bench with manual controls is installed near the base of the crane and the operator manually manages some functions necessary during the shredder maintenance phase. In particular, he must manoeuvre the crane with a relative control unit, manoeuvring the movements of its components through the control unit of the shredder, paying attention to the colleagues inside the machine engaged in the assembly and component change phases.

Maintenance is therefore very complex for the separate management of cranes and shredders and also involves sources of danger for operators engaged with the maintenance. Changing the hammers is very demanding from the point of view of the staff employed.

A shredder with relative system for changing a beater bar is disclosed in document U.S. Pat. No. 3,979,078 A1.

SUMMARY OF THE INVENTION

The object of the invention is to overcome the aforesaid drawbacks and to propose a system and a method for changing the hammers of a shredder which are less complex and require in particular less operators and less auxiliary equipment.

A further object of the invention is to provide a system and a method for changing the hammers of a shredder which offers greater safety than the state of the art.

Further objects or advantages of the invention will be apparent from the following description.

In a first aspect of the invention, the object is achieved by a system for changing the hammers of a shredder of the type initially indicated, which is characterized in that it further comprises (c) a control unit which controls both the first and the second control systems.

An encounter of the controls of the lifting system, for example a crane, and of the shredder simplifies the management of both elements, allowing a single control from a single location, also reducing the staff necessary for maintenance.

Advantageously, the lifting devices are hydraulic lifting devices and the lifting system is hydraulic. In fact, usually shredders and cranes are operated with a hydraulic or oleodynamic system. In this case, the invention further includes in a preferred embodiment thereof, within the system for changing hammers (d) a hydraulic unit which supplies both the hydraulic lifting devices and the hydraulic lifting system.

An oleodynamic or hydraulic supply of the lifting system which no longer has a dedicated local hydraulic power unit, but uses the hydraulic energy supplied by the control unit actually in service at the shredder or vice versa results in a further reduction of the costs for the auxiliary system.

Of course, the lifting devices and/or the lifting system may, in embodiments of the invention, also be operated non-hydraulically by mechanisms or an arrangement well known in the art, in particular in the field of machine construction.

Hammered drums usually comprise at least one block, in particular at least one through pin inside the drum itself, to constrain the hammers to the drum. For maintenance, it is therefore useful to include a locking/unlocking device for said hammers within the system, in particular a pin extractor suitable to extract and insert said at least one pin into said drum, in order to release/constrain said hammers from/to the drum, releasing/engaging them from/to such a block. To further optimize and simplify the management of the system for changing hammers according to the invention, it is advantageous to include that the locking/unlocking device is also controllable by said control unit.

In a very advantageous embodiment, the system for changing hammers of the shredder according to the invention further comprises a remote control device for controlling said control unit. The grouping on a single remote control, such as a radio control, not only reduces costs for the auxiliary system, but increases safety by ensuring greater mobility and increasing visibility in the work area. In fact, the operator will be able to manage both users from a free position. In fact, thanks to remote management he will be able to move where he is most comfortable to see what is happening inside the machine, more actively communicating with the colleagues engaged inside the shredder. In this case, he could then consider also entering the machine with the remote control to better guide the lifting system.

In variants of the invention the lifting system can be a crane, but also very advantageously a robotic arm. The lifting system allows the semi-automatic and automatic management of the machine and avoids the need for the presence of an operator. Other lifting systems on the market are conceivable.

A robotic arm, as well as a crane, have a coupling element which is suitable for attaching the hammer to be replaced. Both a crane and a robotic arm can perform rotational movements to position the coupling element following a circle, even of 360°. Preferably, the rotation movement of the lifting system is also manageable by said control unit. The rotational movement can also be carried out hydraulically with the same supply used by the other hydraulic components of the system.

In a further advantageous embodiment of the invention, the system for changing the hammers of a shredder according to the invention further comprises an electronic safety control for scanning the movement trajectory of the lifting system.

In fact, it is advantageous to supervise all the movements of the lifting system, for example of a crane or a robotic arm, in order to avoid collisions with other metal structures and, above all, with the operators present in the area. The management, even automatic, of the system can also include in all cases of sudden stop, avoiding the occurrence of swing phenomena of the suspended load.

This measure also contributes to the reduction of time and cost as a result of the possible automation of procedures. Greater safety is also obtained due to the lower demand for operators present in the work area and thanks to a system which is capable of reducing collision hazards. In addition to replacing the hammers in the event of complete wear, the maintenance of the hammers may include turning the hammer or repositioning it so that its working faces are in a different position from the previous one, thus allowing the hammers to wear uniformly and allowing each hammer more working hours.

In order to further increase the degree of automation of the system, a variant of the invention includes that the hammers are identifiable by their position and their expected life, for example by numbering them, and that said control unit comprises a program which contains the maintenance plan of the hammers suitable to control the system for changing hammers so as to replace or reposition the hammers automatically according to the maintenance plan. In this regard, sensors can be included on the lifting system which identify the hammer to be changed according to the maintenance plan and therefore its position on the drum to guide the lifting system towards it. Alternatively, the aforementioned program may contain the exact coordinates of each hammer within the shredder and guide the lifting system based thereon.

Preferably, the system for changing hammers according to the invention further comprises at least one storage device for housing hammers which is accessible by said lifting system for picking up new hammers to be installed on the drum or for depositing used hammers extracted from the drum.

For further automation, advantageously, the control unit is adapted to control the lifting device for picking up and depositing the hammers to be replaced and those replaced in predetermined positions on the storage device. The storage device may be any warehouse, e.g., a rack.

A second aspect of the invention relates to a method for changing the hammers of a shredder which comprises the following steps:

(i) providing a shredder with a rotating hammer drum and a hammer lifting system and a locking/unlocking device to unblock/block said hammers from/to said drum;
(ii) opening said shredder;
(iii) unlocking at least one hammer with said locking/unlocking device;
(iv) operating said lifting system and extraction of a hammer at least partially worn from said drum;
(v) alternatively
(v-1) removing a completely worn hammer from said shredder, preferably placing it in a storage device, and providing said lifting system with a new hammer, preferably taken from another or said storage device and inserting said new hammer into said drum in the vacant position; or
(v-2) repositioning a partially worn hammer in the vacant position in said drum so that its working faces are in a different position from the one before extraction;
(vi) locking said new or repositioned hammer with said locking/unlocking device;
(vii) repeating phases (iii) to (vi) for each hammer to be replaced or repositioned or of phases (iv) to (v) if several hammers are unlocked and locked at the same time in phases (iii) and (vi);
(viii) closing the shredder;

wherein phases (ii) to (viii) are controlled by a single control unit, which is preferably controlled remotely, and are preferably managed by hydraulic mechanisms, preferably powered by a single hydraulic power unit.

The advantages of a single hydraulic power unit and a single control unit engaged in the execution of the method have already been illustrated above with reference to the system for changing hammers according to the invention.

Advantageously, the method for changing hammers according to the invention is performed with a system for changing the hammers of a shredder according to the invention by operating its respective components according to their function.

The method can be managed semi-automatically by an operator who intervenes directly on the control unit through a relative interface or using a remote control, thus also being able to move within the system.

Alternatively, the method may be performed in a fully automatic manner, for example during shutdown times or overnight. In this case, advantageously, the method is performed by a program which follows a maintenance plan which identifies the hammers to be replaced or repositioned depending on their expected life and their position on the drum. Production plans can also be considered to determine the state of wear or the expected life of the hammers, such as visual checks inside the shredder can warn of hammer breakage or damage and then insert them in the maintenance plan, even outside their normal wear.

A complete automation avoids having staff which must enter inside the shredder, avoiding safety risks.

The features and advantages disclosed for one aspect of the invention may be transferred mutatis mutandis to the other aspect of the invention.

The industrial applicability is obvious from the moment when it becomes possible to simplify and make changing the hammers of a shredder safer and less demanding from the point of view of costs, auxiliary means and staff.

Said objects and advantages will be further highlighted during the description of a preferred embodiment example of the invention provided by way of example, without limitation.

Variants and further features of the invention are the object of the dependent claims. The description of the preferred exemplary embodiment of the system and method for changing the hammers of a shredder according to the invention is given by way of example and not of limitation, with reference to the attached drawing. In particular, unless specified otherwise, the number, shape, dimensions and materials of the system and of the individual components may vary, and equivalent elements may be applied without deviating from the inventive concept.

BRIEF DESCRIPTION OF THE DRAWINGS

FIG. 1 illustrates, in a simplified diagram, a preferred embodiment for a system for semi-automatically changing the hammers of a shredder.

DETAILED DESCRIPTION

A simplified diagram of a preferred embodiment for a system for semi-automatically changing the hammers of a shredder is shown in FIG. 1. The two main mechanical components of the system are the shredder 10 and a crane 12 designed to transport worn hammers from and new hammers to the shredder. The crane 12 consists of an arm 13 articulated in several points 14. Hydraulic cylinders 16 with their stroke (arrow a) carry out the movement of the members of the arm 13 around the joints 14. An end 13*a* of the arm 13 is equipped with a hook 18 connected to a cable 20 which can be wound/unwound around a roller 22 in order to lower or lift the hook 18. The arm 13 also has a telescopic system 24 allowing an elongation or shortening of the end of the arm 13*a*. The other end 13*b* of the crane 12 which also serves as a support point of the arm 13 is rotatable as indicated by the arrow b.

Passing in the drawing to observe the shredder 10, a housing 26 is noted which consists of several parts, in particular it comprises covers 26*a*, 26*b* and 26*c* which can be lifted during maintenance, for example to change hammers (not shown), with the actuation (movement indicated by the arrows c) of relative hydraulic cylinders 28. Latches 30 serve for the mechanical locking of the covers of the housing 26. They are laterally extracted to then allow the hydraulic cylinders 28 to lift the covers 26*a*, 26*b* and 26*c* or other elements, such as a beam 32 on which the rotors 34 are constrained, which are used to drag the pieces to be shredded. A chute 27 is designed to make the material to be shredded fall inside the shredder 10. The heart of the shredder 10 is the rotating drum 36 carrying hammers (not shown) subject to maintenance.

The system for changing hammers is further equipped with a pin puller 38 which inserts and extracts the pins on which the hammers of the shredder 10 are inserted so as to release the hammers for their replacement and then constrain them again. The movement of the crane 12 is managed by a first group of proportional/manual type directional control valves 40, while the shredder 10 and the pin puller 38 are controlled by a second group of proportional/manual type directional control valves 42 which in turn are controlled by a relative control system 44 and 46, respectively, each powered by an electrical source 48. Both control systems 44, 46 are connected to a common control unit, such as a programmable logic controller 50 (PLC) which is equipped with a radio receiver 52 suitable to receive commands from a remote control 54. The two groups of directional control valves are of the hydraulic type and are supplied by a common hydraulic control unit 56 comprising a circuit of a hydraulic fluid and relative pumping means.

The system shown in FIG. 1 may operate as follows: An operator transmits commands with the remote control 54 to the receiver 52 connected to the control unit 50 which, in response to the command received, activates by means of the control systems 44 and 46 the hydraulic cylinders 28 and the pin puller 38 to open the housing 26 of the shredder 10 and unlock the hammers (not shown) from the drum 36 with the extraction of the pin. With a subsequent command, the operator moves the crane 12, rotating it (arrow b) in the correct position over the selected hammer and bending the arm 13 around the joints 14, possibly changing the length of the end 13*a* and lowering the hook 18 which attaches the hammer. The crane 12 is managed by means of the control unit 50 which acts on the control systems 44 and 46 which in turn actuate the directional valve assemblies 40, 42. Subsequently, the crane 12 removes the hammer from the shredder 10 and places it, for example, in a warehouse (not shown) where it hooks a new hammer and transports it to the vacant position on the drum where it is inserted. If other hammers do not have to be changed in the same manner, the operator no longer intervenes on the crane, which he has moved after the release of the hammer from the shredder but on the pin puller 38 which re-inserts the pin to fix the new hammer on the drum 36. Subsequently, by means of a further command to the control unit 50, rotors 34 and covers 26*a*, 26*b* are lowered to close the housing 26, i.e., the shredding chamber. The shredder is now ready to begin shredding scrap or the like.

The invention claimed is:

1. A system for changing the hammers of a shredder comprising:

(a) a shredder which in turn comprises
  (a1) a housing which defines a shredding chamber and which is equipped with one or more covers, which can be lifted and lowered by means of relative lifting devices;
  (a2) inside said housing a rotating drum equipped with a plurality of hammers;
  (a3) a first control system to control said lifting devices;

(b) a lifting system, suitable to move said hammers by means of a second control system in order to control the movements of said lifting system;

(c) a control unit which controls both the first and the second control system.

2. The system for changing the hammers of a shredder according to claim 1, further comprising a remote control device to control said control unit.

3. The system for changing the hammers of a shredder according to claim 1, wherein said lifting devices are hydraulic lifting devices and said lifting system is hydraulically operated, and further comprising:

(d) a hydraulic power unit that supplies both the hydraulic lifting devices and said lifting system with hydraulic operation.

4. The system for changing the hammers of a shredder according to claim 1, wherein said hammers are lockable to said drum, and wherein said system for changing the hammers of a shredder further comprises a locking/unlocking device of said hammers, to block/unblock said hammers which is controllable by said control unit.

5. The system for changing the hammers of a shredder according to claim 1, wherein said lifting system is a robotic arm.

6. The system for changing the hammers of a shredder according to claim 1, further comprising an electronic safety control for scanning the movement trajectory of said lifting system.

7. The system for changing the hammers of a shredder according to claim 1, wherein said hammers are identifiable by their position and expected life and wherein said control unit comprises a program that contains the maintenance plan of the hammers suitable to control the system for changing the hammers so as to replace one or more hammers or to reposition it/them so that its/their working faces are in a different position from the previous one automatically according to said maintenance plan.

8. The system for changing the hammers of a shredder according to claim 1, further comprising at least one storage device to house hammers which is accessible by this lifting system to take new hammers to be installed on the drum or to place used hammers extracted from the drum.

9. A method for changing the hammers of a shredder comprising the following steps:

(i) providing a shredder with a rotating hammer drum and a lifting system of the hammers and a locking/unlocking device to block/unblock said hammers to/from said drum;

(ii) opening said shredder;

(iii) unlocking at least one hammer with said locking/unlocking device;

(iv) operating said lifting system and extraction of said at least one hammer, which comprises at least one hammer at least partially worn, from said drum;

(v) alternatively (v-1) removing said at least one hammer at least partially worn from said shredder, wherein said at least one hammer at least partially worn is at least one completely worn hammer, and providing said lifting system with a new hammer, and inserting said new hammer into said drum in a vacant position left by removing said at least one completely worn hammer; or (v-2) repositioning of said at least one hammer at least partially worn, which is a partially worn hammer, within said drum so that its working faces are in a different position from the one before the repositioning;

(vi) locking each of said new or repositioned hammer(s) with said locking/unlocking device;

(vii) repetition of phases (iii) to (vi) for a single hammer to be replaced or repositioned in phase (iii) or repetition of phases (iv) to (v) if in phase (iii) several hammers are unlocked;

(viii) closing the shredder;

wherein phases (ii) to (viii) are controlled by a single control unit.

10. The method for changing the hammers of a shredder according to claim 9, wherein the method is automatically managed by a program that performs a maintenance plan identifying the hammers to be replaced or repositioned according to their expected life and their position on the drum.

11. The system of claim 1, further comprising drive rotors to drive material to be shredded.

12. The method of claim 9, wherein after removing the completely worn hammer from said shredder, further comprising the step of placing the completely worn hammer in a storage device, and further comprising the step wherein the new hammer is taken from another or said storage device.

13. The method of claim 9, wherein phases (ii) to (viii) are controlled by a single control unit, which is controlled remotely.

14. The method of claim 9, wherein phases (ii) to (viii) are managed by hydraulic mechanisms powered by a single hydraulic power unit.

* * * * *